US008145991B2

(12) United States Patent
Youenn (10) Patent No.: US 8,145,991 B2
(45) Date of Patent: Mar. 27, 2012

(54) METHODS AND DEVICES FOR OPTIMIZING THE PROCESSING OF XML DOCUMENTS

(75) Inventor: Fablet Youenn, La Dominelais (FR)

(73) Assignee: Canon Kabushiki Kaisha, Tokyo (JP)

( * ) Notice: Subject to any disclaimer, the term of this patent is extended or adjusted under 35 U.S.C. 154(b) by 1094 days.

(21) Appl. No.: 11/848,676

(22) Filed: Aug. 31, 2007

(65) Prior Publication Data

US 2008/0077554 A1   Mar. 27, 2008

(30) Foreign Application Priority Data

Sep. 25, 2006  (FR) ...................................... 06 53930

(51) Int. Cl.
*G06F 17/00*   (2006.01)
(52) U.S. Cl. .......................... 715/234; 715/205; 715/255
(58) Field of Classification Search .................. 715/234, 715/254, 239, 242, 229, 205–208, 255; 717/143, 717/151, 159
See application file for complete search history.

(56) References Cited

U.S. PATENT DOCUMENTS

| | | | | | |
|---|---|---|---|---|---|
| 5,634,064 | A | * | 5/1997 | Warnock et al. | 715/208 |
| 5,977,972 | A | * | 11/1999 | Bates et al. | 715/786 |
| 6,177,936 | B1 | * | 1/2001 | Cragun | 715/760 |
| 6,262,732 | B1 | * | 7/2001 | Coleman et al. | 715/835 |
| 6,295,542 | B1 | * | 9/2001 | Corbin | 715/205 |
| 6,925,594 | B2 | * | 8/2005 | Dutta et al. | 715/205 |
| 7,073,120 | B2 | * | 7/2006 | Torii et al. | 715/239 |
| 7,134,075 | B2 | * | 11/2006 | Hind et al. | 715/239 |
| 7,213,198 | B1 | * | 5/2007 | Harik | 715/234 |
| 7,426,689 | B2 | * | 9/2008 | Simonds et al. | 715/234 |
| 7,533,138 | B1 | * | 5/2009 | Martin | 1/1 |
| 7,617,458 | B1 | * | 11/2009 | Wassom et al. | 715/760 |
| 7,634,716 | B1 | * | 12/2009 | Law et al. | 715/205 |
| 7,650,349 | B2 | * | 1/2010 | Yeh et al. | 715/205 |
| 8,032,827 | B2 | * | 10/2011 | Melander et al. | 715/234 |
| 2002/0016801 | A1 | * | 2/2002 | Reiley et al. | 707/523 |
| 2002/0120664 | A1 | * | 8/2002 | Horn et al. | 709/107 |
| 2002/0199170 | A1 | * | 12/2002 | Jameson | 717/120 |
| 2004/0049509 | A1 | * | 3/2004 | Keller et al. | 707/100 |
| 2004/0237034 | A1 | * | 11/2004 | Chiang et al. | 715/513 |
| 2005/0055529 | A1 | * | 3/2005 | Lubbers et al. | 711/203 |
| 2005/0193135 | A1 | * | 9/2005 | Owen et al. | 709/230 |
| 2007/0050431 | A1 | * | 3/2007 | Vaidya et al. | 707/204 |
| 2007/0136318 | A1 | * | 6/2007 | Clark et al. | 707/100 |
| 2008/0295018 | A1 | * | 11/2008 | Nurmi et al. | 715/780 |
| 2011/0202888 | A1 | * | 8/2011 | Rusu et al. | 715/855 |

OTHER PUBLICATIONS

Michael Kay, "Cross-references among included schema documents", Stylus Studio, Sep. 26, 2004.
"XML Schema Part 1: Structures", W3C, May 2, 2001.

* cited by examiner

*Primary Examiner* — Thu Huynh
(74) *Attorney, Agent, or Firm* — Fitzpatrick, Cella, Harper & Scinto (57) ABSTRACT

Methods and devices for optimizing the processing of documents of the XML type comprising components are described. After having identified the required XML document and the processing mode that is to be performed on this document, for example forward or backward, the client sends a request comprising this information. On receipt of this request, the server accesses the document identified and the sequencing according to the processing mode that has to be performed before transmitting it. If the processing mode is of the backward type, it is not necessary to process all the document in order to transmit it, it may be transmitted gradually as sequencing takes place. The algorithms for sequencing and processing the components of an XML document are adapted to process the simple components and the components having circular references.

25 Claims, 7 Drawing Sheets

```
<descriptions targetNamespace='http://www.myid.org'>
    <message name='msg'>
        <part name='part' element='elt'/>
    </message>
    <binding name='bd' type='pt'>
        <operation name='op'>
        </operation>
    </binding>
    <portType name='pt'>
        <operation name='op'>
            <input message='msg'/>
        </operation>
    </portType>
</descriptions>
```

Fig. 7

```
<!--schema entirely backward -->
<schema t:order='backward'>
    <element name='myelement' type='mytype'/>
    <complexType name='mytype'/>
</schema>

<!--schema entirely forward -->
<schema t:order='forward'>
    <element name='myelement' type='mytype'/>
    <complexType name='mytype'/>
</schema>

<!--schema forward with components mixed -->
<schema t:order='forward'>
    <complexType name='mytype' t:order='mixed'/>
    <element name='myelement' type='mytype' t:order='mixed'/>
</schema>

<!--schema backward with components mixed -->
<schema t:order='backward'>
    <element name='myelement' type='mytype' t:order='mixed'/>
    <complexType name='mytype' t:order='mixed'/>
</schema>
```

Fig. 8

METHODS AND DEVICES FOR OPTIMIZING THE PROCESSING OF XML DOCUMENTS

BACKGROUND OF THE INVENTION

The present invention concerns access to documents of the XML (eXtensible Markup Language) type and more particularly methods and devices for optimizing the processing of XML documents.

The XML format is a standard for representing data in text form. These data are organized in a hierarchical manner in the form of trees. The XML processing entities, or parsers, give access to the data of the XML document via this tree structure.

There exist various types of XML parsers. The DOM (Document Object Model) constructs the entire tree in memory and enables a user to navigate in this tree composed of XML nodes. The drawbacks of this model are the amount of memory necessary for its implementation and the need to receive the whole of the document before beginning to process it.

To resolve these problems, other parser models have been developed, such as the SAX (Simple API for XML) and PULL models according to which a tree is not constructed in memory. Such parsers make it possible to navigate in the XML tree by going from XML node to XML node, using an in-depth exploration algorithm first of all. It keeps in memory only the current node of the XML tree. In this context, a XML node can in particular correspond to an opening XML element, a closing XML element or a text element. In the following example, the XML fragment contains three nodes: a opening element, a text node and a closing node.

<ns:example attribute='value'>
Textnode
<\ns:example>

The XML parser breaks down each node into a set of items, represented in the form of a character chain, the exact set of items depending on the exact implementation of the parser. Taking the previous example, the first node (the opening element) can be separated into four items: "ns" (or "ns:example" depending on the implementation of the parser), "example", "attribute" and "value". The second node is represented as a single item: "TextNode". The third node is represented by two items: "ns" (or "ns:example" depending on the implementation of the parser) and "example". Each item has a particular function and is made accessible to the parser via a particular API (Application programming interface).

In the case of SAX for example, the parser calls functions implemented by the application, specialized for each type of node. Taking the previous example again, the SAX parser will call in the following order:

1. a function of the "STARTTAG" type with, as a parameter, the local name of the element (here "example"), its qualified name (here "ns:example"), and a list of attributes (here a single attribute whose name is "attribute" and value is "value");

2. a function of the "TEXTNODE" type with, as a parameter, the value of the text node (here "textnode"); and, 3. a function of the "ENDTAG" type with, as a parameter, the local name of the element (here "example") and its qualified name (here "ns:example").

The application can then use each item passed by the parser as a parameter of the functions for processing the data.

XML language is used as a basis by certain languages such as WSDL, XML Schema or Relax NG, which describe components. These languages define various types of component. These components are described as XML elements within an XML document. The identification of a component, called the QName of a component, corresponds to the name of the component associated with an identifier global to all the components of the document. A component is identified uniquely by its QName name and its type. These identifiers are particularly used to connect two components. During the XML processing of the components, it is necessary to connect the components together, following the links expressed in the form of references by QName. These links can also point to components already defined ("backward" reference) or not yet defined ("forward" reference), as shown on FIG. 7.

Figure 7:
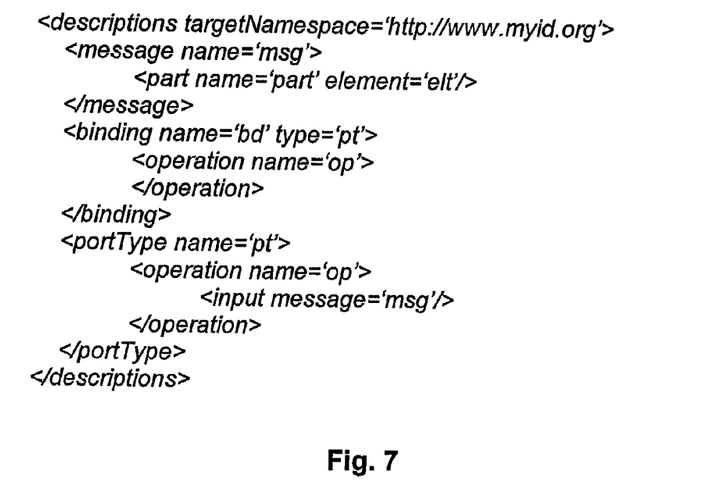
FIG. 7 depicts an example of XML code illustrating links to components already defined and subsequently defined.

According to FIG. 7, the identifier "msg" of the line "input message="msg"" refers to the line "message name="msg"" and the identifier "pt" of the line "binding name="bd" type="pt" refers to the line "portType name="pt"". Thus the identifier "msg" points to a component already defined whilst the identifier "pt" points to a component that is defined only subsequently in the document.

Circular references can also be used. For example, a first component references a second component that itself references a third component that references the first component. If circular references exist, at least one component is of the mixed type, that is to say at least one component has "backward" and "forward" references. It should however be noted that an unsequenced initial document may have components of the mixed type, that, after the resequencing of the document, are of the "forward" or "backward" type and therefore do not correspond to circular references.

During a progressive processing of an XML document, it is necessary to manage these references, whether or not the components are defined. This management requires significant memory and calculation resources.

Many documents are in "backward" mode. This is in particular the standard writing mode for WSDL documents. This mode makes it possible to resolve a reference at the time that this reference is detected.

This principle of passing from a document without order to a document in "backward" mode is described in the American patent application US 20050193135. According to the description of this application, a server receiving a request for a document modifies the structure of the document in order to put it in "backward" mode and transmits it to the client. In this context, the client can only process documents in "backward" mode. This solution does not take into account circular references. Nor does it take into account the situations where the document processing unit would have had an advantage in receiving the document comprising the references sequenced according to the "forward" mode.

SUMMARY OF THE INVENTION

The invention makes it possible to resolve at least one of the problems disclosed above and to optimize the processing of XML documents using the mechanism of reference by QName such as XML documents based on the WSDL, XML Schema and Relax NG languages.

Thus an object of the invention is a method for optimizing the processing of a document of the XML type comprising a plurality of components, this method comprising the following steps:

receiving an identification of the document and an identification of the document processing mode;
accessing the document according to the identification of the document; and
sequencing and coding the plurality of components of the document according to the identification of the document processing mode.

The method according to the invention makes it possible to optimize the processing of XML documents using an adapted coding. The coded document, or part of the coded document, can be transmitted to a client or stored for subsequent use. It is thus possible to store several versions of a document so that the document in its version adapted to the type of processing that is to be applied to it, is directly available.

Another object of the invention is a method of transmitting a document of the XML type comprising a plurality of components, this method comprising the following steps:

receiving a request to transmit the document, the request comprising an identification of the document and an identification of the document processing mode;

accessing the document according to the identification of the document;

obtaining the plurality of components of the document, sequenced according to the identification of the document processing mode; and     transmitting at least one sequenced component of the plurality of components of the document.

According to this embodiment, the document sequenced according to the requested format is directly transmitted to the client. The processing of the document can commence even before the whole of the document is received.

The document processing mode is preferably of the forward or backward type. Forward processing mode is preferably used when a client wishes to access only a subset of the document whilst backward processing mode is preferably used when a client wishes to access the whole of the document.

In a particular embodiment and when the document processing mode is of the backward type, the sequencing and coding step comprises the following steps:

selecting a component of the document;

identifying the references of the component selected;

adding the component to a dependency list and updating said dependency list;

analyzing the dependency list in order to determine whether at least one component is ready to be coded; and     if at least one component in the dependency list is ready to be coded, coding the component ready to be coded and updating the dependency list.

Alternatively, when the document processing mode is of the forward type, the sequencing and coding step can comprise the following steps;

for each component of the document selecting the component;

identifying the references of the selected component;

adding the selected component to a dependency list and updating the dependency list;

for each component in the dependency list, selecting the component; and coding the component selected and updating the dependency list.

Another object of the invention is a method for optimizing the processing of a document of the XML type comprising a plurality of components, this method comprising the following steps:

identifying the document;

identifying the document processing mode;

transmitting a request for accessing the document sequenced according to the mode determined by the identification of the document processing mode;

accessing at least one component of the document sequenced according to the mode determined by the identification of the document processing mode; and     processing the at least one accessed component of the document, according to the identification of the document processing mode.

According to this embodiment, the client requests a document of the XML type in the format adapted to the processing of this document by the client in order to optimize the processing.

Once again, the document processing mode is preferably of the forward or backward type. Forward processing mode is preferably used when a client wishes to access only a subset of the document whilst backward processing mode is preferably used when a client wishes to access the whole of the document.

According to a particular embodiment and when the document processing mode is of the forward type, the step of processing the component accessed comprises the following steps:

establishing the list of components sought in the document;

selecting a component accessed;

analyzing the list of components sought in order to determine whether the selected component accessed belongs to the list of components sought;

if the selected component accessed belongs to the list of components sought, analyzing the selected component accessed in order to determine whether the selected component accessed refers to at least one other component;

if the selected component accessed refers to at least one other component, adding the at least one other referenced component to the list of components sought.

Alternatively, when the document processing mode is of the backward type, the step of processing the at least one component accessed comprises the following steps,     selecting a component accessed;

identifying the references of the selected component accessed;

if the selected component accessed does not have a reference, adding the selected component accessed to a list of components;

if said selected component accessed has at least one reference, analyzing the selected component accessed; and storing the references;

or resolving the references and adding the selected components accessed to the list of components.

Still according to a particular embodiment, at least one of the components of the document is of the simple type or mixed type.

Another object of the invention is a device for optimizing the processing of a document of the XML type comprising a plurality of components, this device comprising the following means:

means of receiving an identification of the document and an identification of the document processing mode;

means of accessing the document according to the identification of the document; and     means of sequencing and coding the plurality of components of the document according to the identification of the document processing mode.

The device according to the invention makes it possible to optimize the processing of the XML documents by an adapted coding. The coded document, or part of the coded document, can be transmitted to the client or stored for subsequent use. It is thus possible to store several versions of a document so that the document, in its version adapted to the type of processing that is to be applied to it, is directly available.

Another object of the invention is a device for transmitting a document of the XML type comprising a plurality of components, this device comprising the following means, means of receiving a request to transmit the document, the request comprising an identification of the document and an identification of the document processing mode;

means of accessing the document according to the identification of the document;

means of obtaining the plurality of components of the document, sequenced according to the identification of the document processing mode; and means of transmitting at least one sequenced component of the plurality of components of the document.

According to this embodiment, the document sequenced according to the requested format is directly transmitted to the client. Processing of the document can commence even before the whole of the document is received.

According to a particular embodiment, the device of the invention also comprises the following means:

means for selecting a component of the document;

means for identifying the references of the component selected;

means for adding the component to a dependency list and updating said dependency list;

means for selecting a component of the dependency list; and means for coding the selected component in the dependency list and for updating the dependency list.

Another object of the invention is a device for optimizing the processing of a document of the XML type comprising a plurality of components, this device comprising the following means:

means of identifying the document;

means of identifying the document processing mode;

means of transmitting a request for accessing the document sequenced according to the mode determined by the identification of the document processing mode;

means of accessing at least one component of the document sequenced according to the mode determined by the identification of the document processing mode; and means of processing the at least one accessed component of the document, according to the identification of the document processing mode.

According to this embodiment the client requests a document of the XML type in the format adapted to the processing of this document by the client in order to optimize the processing.

According to a particular embodiment, the device according to the invention also comprises the following means:

means for establishing the list of components sought;

means for selecting a component accessed;

means for analyzing the list of components sought in order to determine whether the selected component accessed belongs to the list of components sought;

means for analyzing the selected component accessed in order to determine whether the selected component accessed refers to at least one other component; and means for adding the at least one other referenced component to the list of components sought.

Still according to a particular embodiment, the device according to the invention also comprises the following means:

means for selecting a component accessed;

means for identifying references of the selected component accessed;

means for adding the selected component accessed to a list of components;

means for storing the references; and, means for resolving the references.

Another object of the invention is a computer-readable medium comprising instructions adapted to carry out the steps of, receiving an identification of the document and an identification of the document processing mode;

accessing the document according to the identification of the document; and sequencing and coding the plurality of components of the document according to the identification of the document processing mode.

BRIEF DESCRIPTION OF THE DRAWINGS

Other advantages, aims and characteristics of the present invention will emerge from the following detailed description given by way of non-limiting example with regard to the accompanying drawings, in which.

DETAILED DESCRIPTION OF THE INVENTION

According to the invention, when a client wishes to access the components of an XML document or certain components of an XML document, he determines the processing mode of the XML document and requests the document in its corresponding version, "backward" version or "forward" version. If the client needs the document in its entirety, he preferably requests the "backward" version of the document. If the client wishes to recover only a subset of the document, he preferably requests the "forward" version. It often happens that a client wishes to recover only a subset of components, or even a single component, of a document, for example when he accesses documents pointed to by functions of the xs:import or wsdl:import type, when he is analyzing WS-Discovery messages giving a reference to a particular service or when a code generator wishes to generate the code of a particular interface.

When the server receives a request for an XML document in a particular version, it accesses the document, organizes it according to the requested version and preferably adds a marker to the document in order to indicate the global order according to which the document has been sequenced. It adds markers in the document if it has not been possible to perform the sequencing in its entirety because for example of circular references or memory constraints limiting the number of components stored at a given time during the sequencing.

The client, receiving the XML document sequenced according to the chosen version, processes the document, following the order and information contained in the document.

The request for an XML document sequenced according to a particular mode, received by the server, can be sent by the client as mentioned above or can be sent locally, for example to another application of the server.

Figure 1:
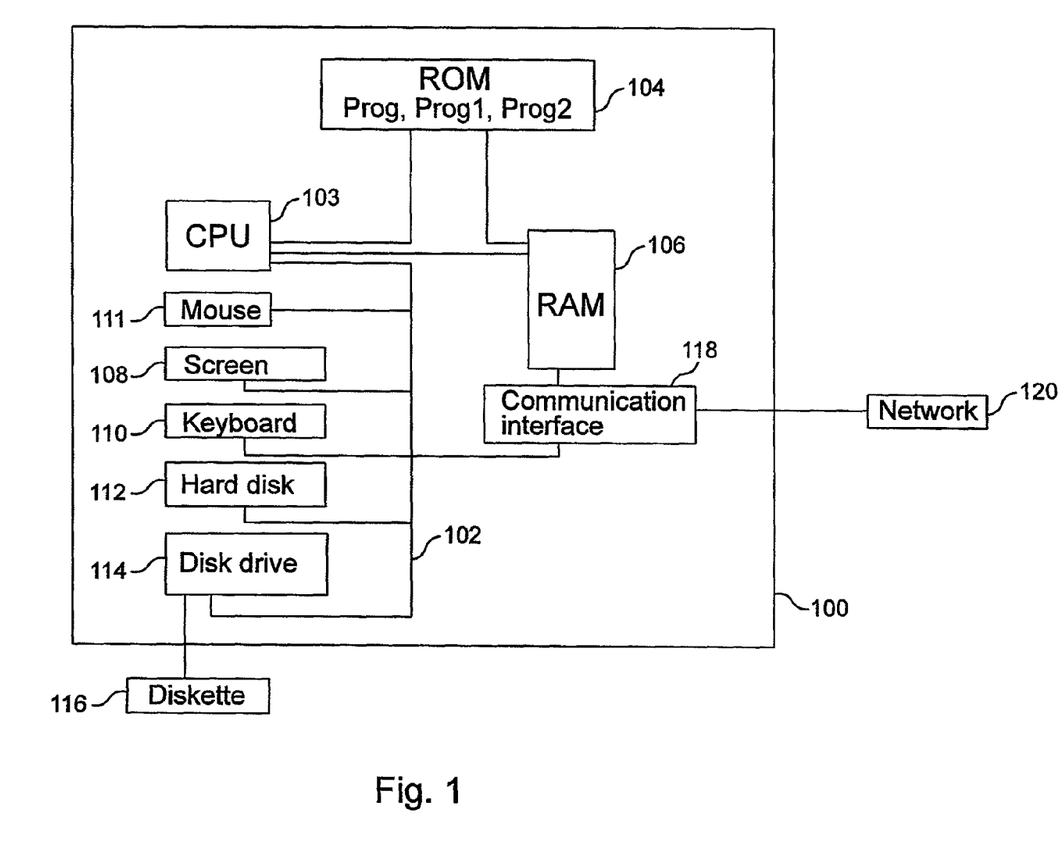
FIG. 1 shows an example of an apparatus for implementing the invention.

FIG. 1 illustrates an example of an apparatus 100 adapted to implement the invention, such as a microcomputer, a workstation, a digital assistant, a portable telephone or a multimedia server.

The apparatus 100 preferably comprises a communication bus 102 to which there are connected
 a central processing unit 103 such as a microprocessor;
 a read-only memory 104 (ROM), able to contain one or more programs "Prog", "Prog1" and "Prog2";
 a random access memory 106 (RAM), containing registers adapted to store variables and parameters created and modified during the execution of the aforementioned program; and
 a communication interface 118 connected to a distributed communication network 120, for example the Internet, the interface being able to transmit and receive data.

The apparatus 100 can optionally have available one, more or all of the following devices:
 a screen 108 for displaying data and/or serving as a graphical interface with the user, who will be able to interact with the programs according to the invention, by means of a keyboard 110 or any other means such as a pointing device, such as a mouse 111 or an optical pen, a touch screen or a remote control;
 a hard disk 112 able to contain programs and/or data, in particular data processed or to be processed according to the invention;
 a disk drive 114 adapted to receive a diskette 116 and to read or write thereon data processed or to be processed according to the invention;
 a memory card reader adapted to read or write data thereon, in particular data processed or to be processed according to the invention.

The communication bus affords communication and interoperability between the various elements included in the apparatus 100 or connected to it. The representation of the bus is not limiting and in particular the central unit is able to communicate instructions to any element of the appliance 100, directly or by means of another element of the apparatus 100.

The executable code of the program or programs enabling the apparatus 100 to implement the processes according the invention can be stored for example on the hard disk 112 or in read-only memory 104.

According to a variant the diskette 116 can contain data as well as the executable code of the aforementioned programs which, once read by the apparatus 100, can be stored in the hard disk 112.

Alternatively, the executable code of the programs can be received by means of the communication network 120, via the interface 118, in order to be stored in an identical fashion to that described above.

The diskettes can be replaced by any information medium such as, for example, a compact disk (CD-ROM) or memory card. In general terms, an information storage means that can be read by a computer or a microprocessor, integrated or not in the apparatus, possibly removable, is adapted to store one or more programs whose execution makes it possible to implement the method according to the invention.

In more general terms, the program or programs can be loaded into one of the storage means of the apparatus 100 before being executed.

The central unit 103 controls the execution of the instructions or portions of software code of the program or programs according to the invention, instructions that are stored on the hard disk 112, in the read-only memory 104 or in the other aforementioned storage elements. On powering up, the program or programs stored in a non-volatile memory, for example the hard disk 112 or read-only memory 104, are transferred into the random access memory 106 (RAM), which then contains the executable code of the program or programs according to the invention, as well as registers for storing the variables and parameters necessary for implementing the invention.

It should be noted that the apparatus comprising the device according to the invention may also be a programmed apparatus. The instructions of the program or programs implementing the invention can for example be implemented in a programmable or specific integrated circuit (Application-Specific Integrated Circuit, ASIC).

Figure 2:
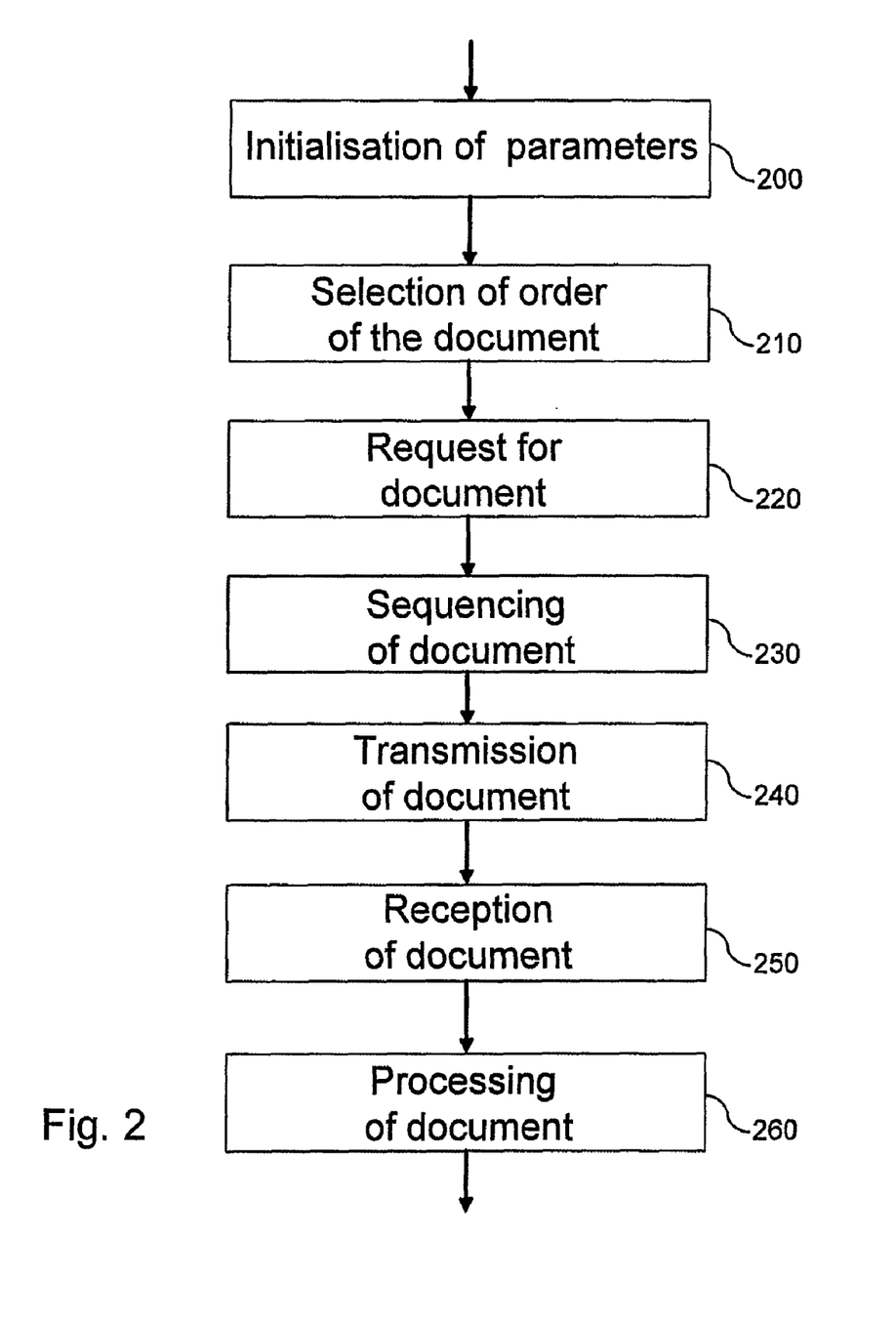
FIG. 2 depicts schematically the general algorithm for implementing the invention.

FIG. 2 illustrates the general algorithm for implementing the invention. According to the first step, the document that is to be accessed, or target document, is selected and the processing parameters are initialized (step 200). The processing parameters relate in particular to the required processing result. The order of processing of the selected document is determined according to these processing parameters (step 210). As mentioned previously, when the whole of the document is to be processed, it is advantageous to choose "backward" mode in order to be able to resolve the references immediately rather than to defer them for the time required to recover all the components. Conversely, when only a subset of a document is to be processed, it is useful to use "forward" mode. This mode makes it possible, when the document is processed, to process only the useful parts of the document. The client then sends a request, for example to a server, to obtain the selected document according to the mode determined (step 220). The selected document is found, for example by the server. It is modified so as to be sequenced according to the mode determined (step 230), coded and transmitted (240). After reception (step 250), the document is processed (step 260). Alternatively, a document can be sequenced according to one mode, another mode or several modes and stored so as to be able to be used or transmitted directly subsequently.

The type of connection between the client and server is not directly involved in the implementation of the invention. It is therefore not analyzed in detail. It may have been in particular an Internet, Ethernet or wireless connection.

Figure 8:
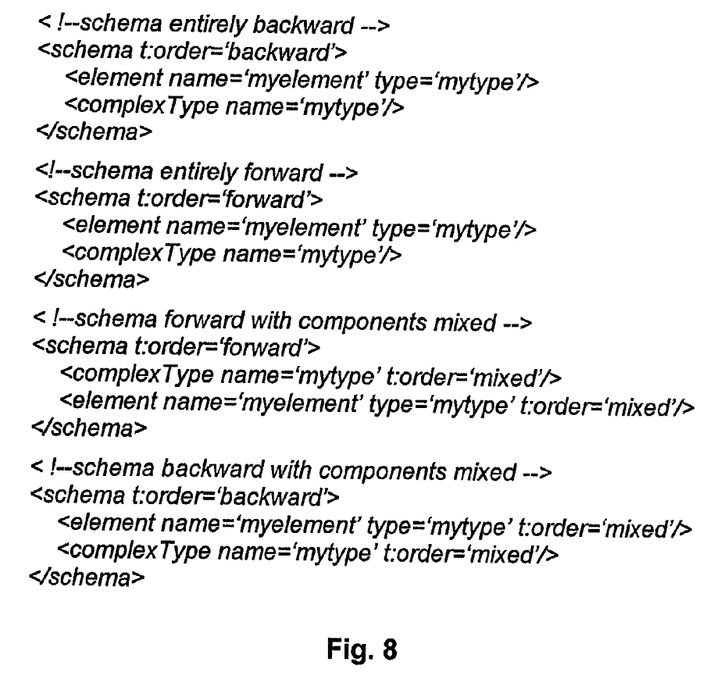
FIG. 8 depicts an example of XML code illustrating the use of markers in a sequenced document, specifying the mode of the components.

Since circular references may be present in the document selected, it is preferable to add markers in the sequenced document, specifying the mode of the components, eg "backward", "forward" and "mixed". These indications may be in the form as depicted on FIG. 8.

The sequencing of the XML documents is preferably automatic. For sequencing according to "backward" mode, it is not necessary to process all the document before commencing transmission of the components.

The example illustrated of implementation of the sequencing algorithms is based on a common structure: the list Ld of dependencies. This list contains, for each component, its XML description (according to any format), the list Li of unknown referenced components, the list Lc of known referenced components and the list Lr of components referencing this component. This list Ld is sequenced according to the following rule: for any component in the list, the referenced components are situated earlier in the list and conversely the referencing components are situated later in the list.

A component is inserted in the list Ld in two steps. First of all, the lists of unknown and known referenced components of all the components of the list referencing this component are updated. The position of the component in the list is then determined. The position of the highest referenced component, Pe and the position of the lowest referencing component, Pa are calculated. If Pe is less than Pa, the component is inserted at the position Pe+1.

If Pe is higher than Pa, the list Lbe of the components of Lc whose position is between Pe and Pa and the list Lbr of the components of Lr whose position is between Pe and Pa are recovered. It is then sought to move the components of Lbe below Pa and the components Lbr below Pe. A component is moved in the following fashion:
- a component can exchange its position with its direct higher neighbour if the higher neighbour does not reference the components;
- a component can exchange its position with its direct lower neighbour if this component does not reference this lower neighbour; and
- if the position of the component cannot be exchanged with that of its neighbour in a given direction, it is sought first of all to move the neighbour in the given direction and so on.

If reorganization is not possible, a cycle is detected. In this case, all the components remaining between Pe and Pa and the component to be added are aggregated in a single component in the list of components. The lists Li, Lr and Le of each aggregated component are combined and this new component is placed in the list at Pe+1.

It should be noted that, according to the type of document, certain types of component are never referenced or are referenced solely in a precise sense, which makes it possible to simplify the management described above. For example, a simple schema type never references a complex type.

The coding of a component differs depending on whether it is a case of an aggregated component or a non-aggregated component. To code a non-aggregated component, its internal description is used to reconstruct its XML representation. In order to code an aggregated component, it is possible to code the first component by indicating the "mixed" mark, to code all the components except the last one, and to code the last component by indicating the "mixed end" mark.

Figure 3:
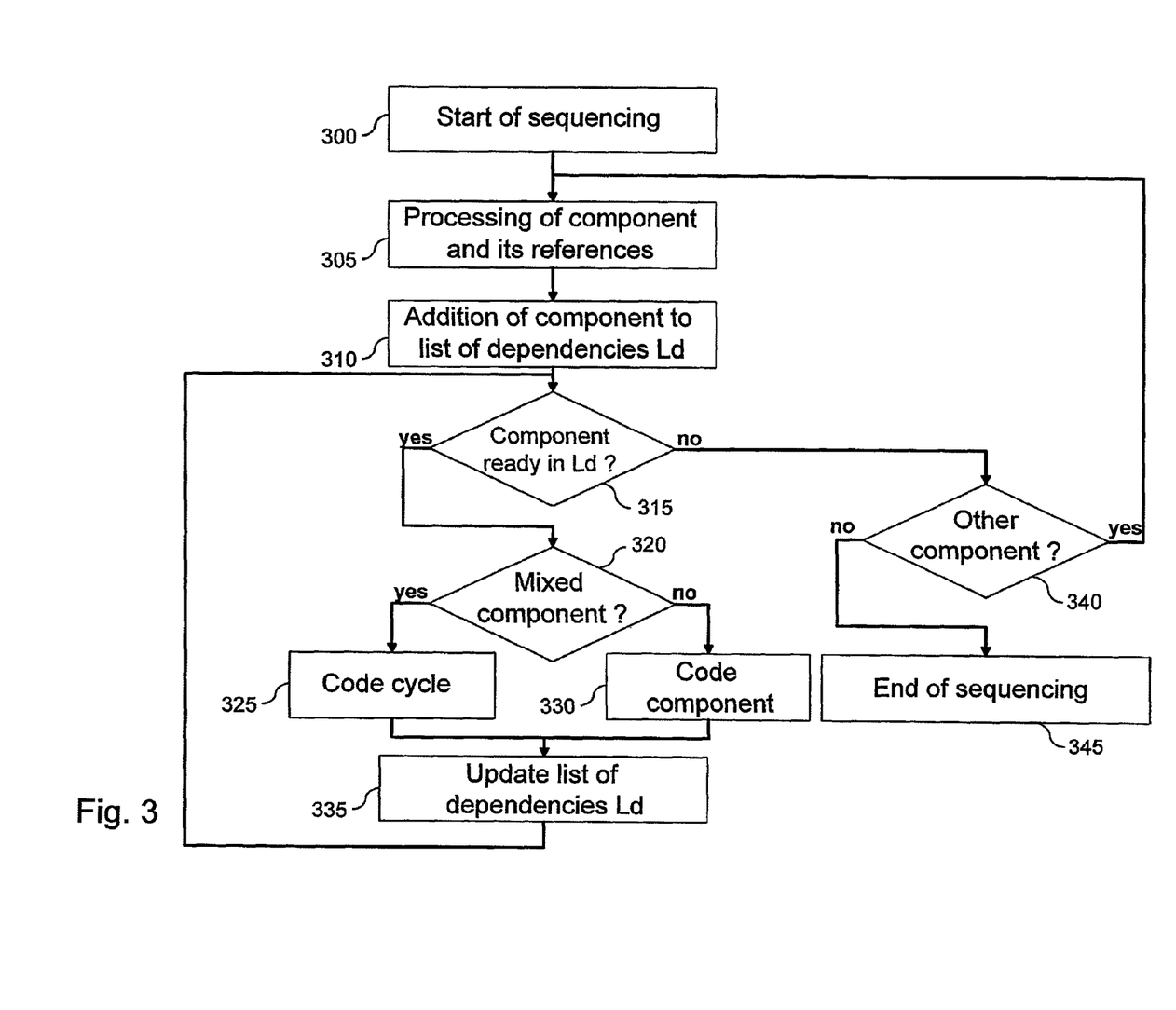
FIG. 3 illustrates an example of a document-sequencing algorithm according to a "backward" mode.

The algorithm presented in FIG. 3 makes is possible to resequence the components of XML documents in a "backward" mode whilst detecting the case of circular references and optimizing the processing by storing as little information as possible. This sequencing algorithm makes it possible to code the data to be transmitted.

The first component of the document is first of all selected (step 300). All the references of this component are identified and all the information of the component are stored in any form, for example in a memory area (step 305). The references are identified by means of a processor dedicated to the language that defines the components and the references such as WSDL, XML Schema or Relax NG, or with a general processor possessing the necessary information. This selected component is added to the list Ld of dependencies, which is updated according to the method mentioned previously (step 310).

A test is then carried out in order to determine whether a component of the list Ld can be coded (step 315). A component can be coded if its list of unknown references and its list of known references are empty. It is also possible to carry out this test before adding the selected component to the list Ld. If a component is ready to be coded, it is coded and preferably transmitted. For this purpose a test is carried out in order to determine whether or not the component ready to be coded is of the mixed type (step 320). If the component ready to be coded is of the mixed type, all the subcomponents of the component ready to be coded are coded, marked with an indication of the mixed type (step 325). If the component ready to be coded is not of the mixed type, this component is coded simply from the stored information on the component selected (step 330).

The list Ld of dependencies is then updated (step 335) by updating the lists Lc of the components referencing the coded components. The test for determining whether a component of the list Ld can be coded (step 315) is then once again performed.

If no component is ready to be coded, a test is carried out in order to determine whether the document to be coded, and possibly to be transmitted, comprises at least one other component (step 340). If the document to be coded comprises at least one other component, this component is selected and the previous steps are repeated (305 to 340). If the document to be coded does not include another component, the sequencing method is terminated (step 345). The document has been coded and possibly transmitted to the client or stored.

Figure 4:
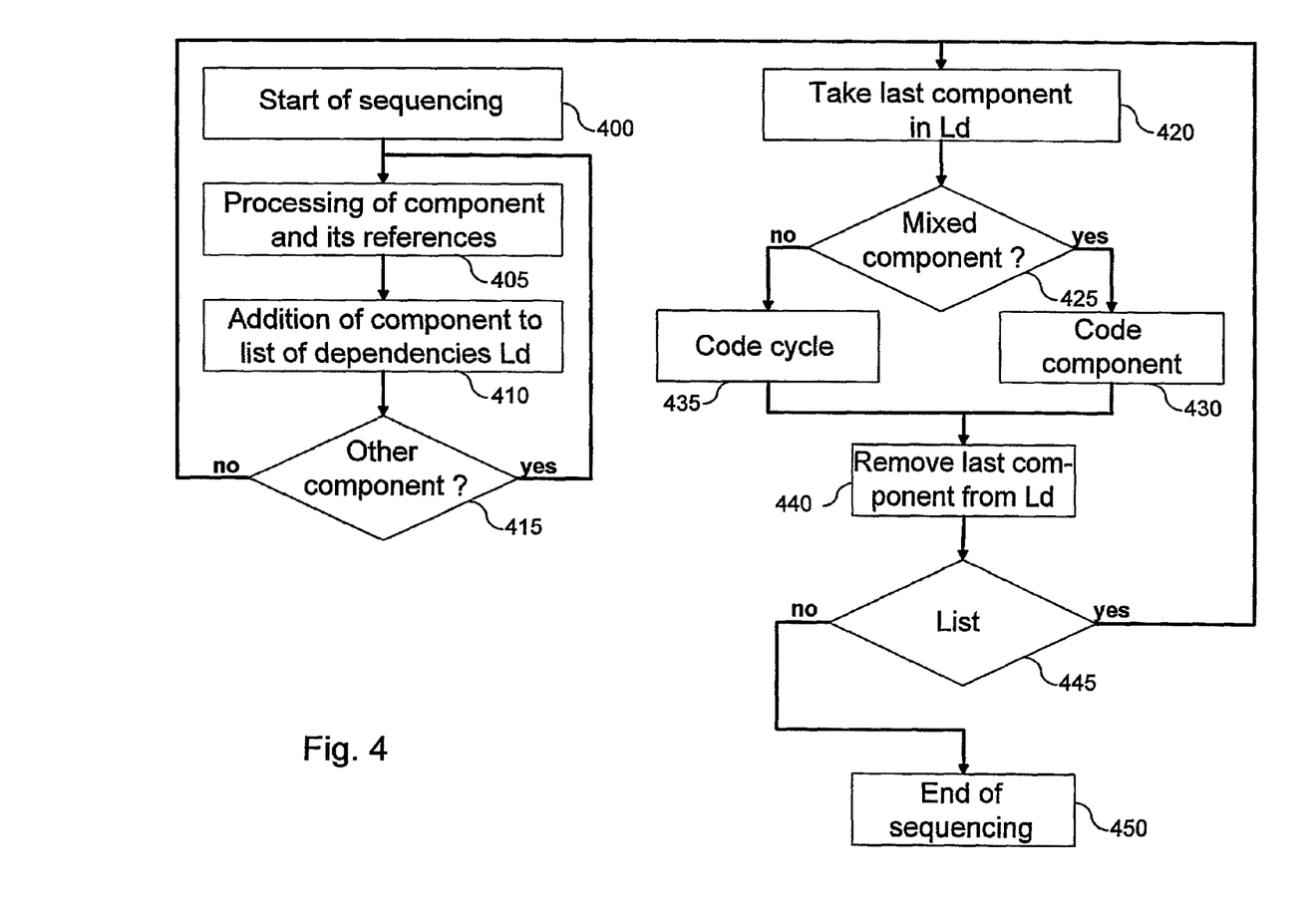
FIG. 4 illustrates an example of a document-sequencing algorithm according to a "forward" mode.

The sequencing algorithm according to the "forward" mode, depicted in FIG. 4, repeats the same principle as the "backward" algorithm. Steps 400, 405 and 410 are similar to steps 300, 305 and 310 respectively. The first component of the document is first of all selected (step 400). All the references of this component are identified and all the information on the component is stored in any form, for example in a memory area of the component (step 405). The references can be identified by means of a processor dedicated to the language that defines the components and the references or with a general processor possessing the necessary information. This selected component is added to the list Ld of dependencies, which is updated according to the method mentioned previously (step 410).

Unlike the algorithm according to 'backward' mode, the construction of the list of dependencies is continued until the end of the document. For this purpose, after having added the selected components to the list Ld of dependencies and having updated this list, a test is performed in order to determine whether the document to be coded comprises at least one other component (step 415). If the document to be coded comprises at least one other component, this component is selected and the previous steps are repeated (steps 405 to 415). If the document to be coded does not include any other component, the last component in the list Ld of dependencies is selected step 420).

The component selected, that is to say the last component of the list Ld, is removed from the list Ld of dependencies (step 440) and a test is carried out in order to determine whether the list Ld of dependencies contains at least one other component (step 445). If the list Ld of dependencies contains another component, steps 420 to 445 are repeated. If the list Ld of dependencies does not contain any other component, the sequencing method is terminated (step 450). The document is ready to be stored or transmitted to the client.

Figure 5:
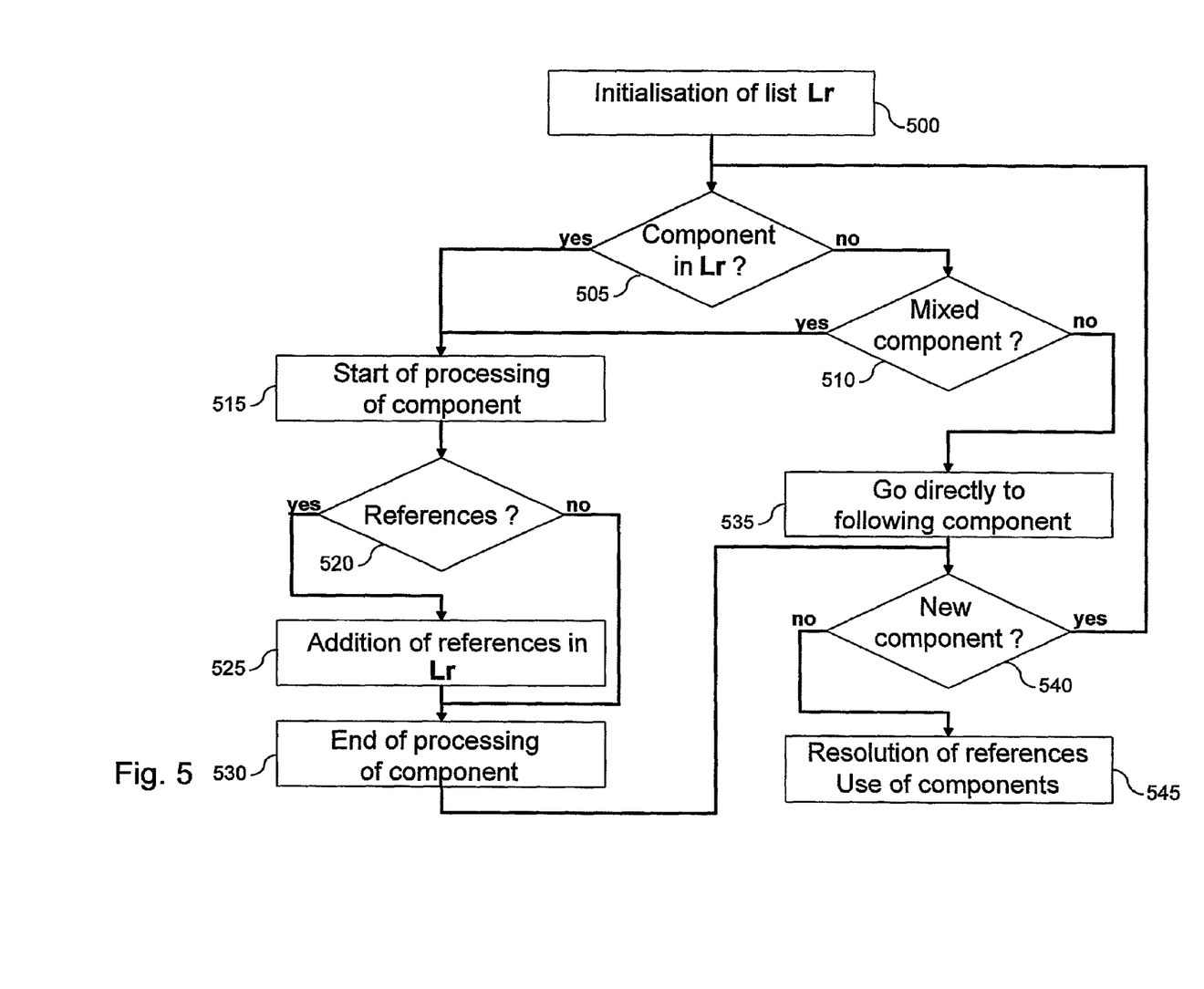
FIG. 5 illustrates an example of an algorithm for processing a sequenced document according to a "forward" mode.

The processing or decoding algorithm illustrated in FIG. 5 uses the organization according to "forward" mode of the document received by the client in order to improve the processing or decoding of the received document. In particular, the algorithm in FIG. 5 optimizes the processing or decoding when only a subset of the components of the document is to be used.

It should be noted that the document received may have been coded in advance and stored (locally or on a distant site) or that it may be coded when the client sends his request.

After having initialized the list Lr of the components sought according to the requirements of the application that initiated the request for the XML document, the processing of the XML document commences with the detection of the first component received (step 500). A first test consists of determining whether the component received belongs to the list of components sought (step 505). If the component received does not belong to the list of components, a second test is used for determining whether the component received is of the mixed type, ie whether it forms part of a set of components making circular references (510).

If the component received belongs to the list of components sought or if the component received is of the mixed type, the processing of the component received commences (step 515). The processing of the component received is carried out in parallel with the specific steps mentioned. Generally, during this step the information on the components, in particular their name and their various properties, is stored in the form, for example, of objects or structures. By way of illustration and taking the example cited previously comprising the component portType "pt", an object of the interface type, keeping the name of the component in the form of an object String, and an object list of the Operation type, are created. When this processing has ended, the application recovers this information, for example these objects or structures, for a particular use such as code generation or graphical interface generation. A test is performed in order to determine whether the component received refers to other components (step 520). If the component received refers to other components, these references are added to the list of components sought (step 525). When the processing of the component received has ended (step 530) a test is carried out in order to determine whether a new component has been received (step 540).

If the component received does not belong to the list of components sought or if the component received is not of the mixed type, the algorithm passes to the processing of the following component (step 535). A test is carried out in order to determine whether a new component has been received (step 540).

If a new component is received, the previous steps (505 to 540) are repeated. Step 540 makes it possible to iterate the process on all the components received. When all the components of the document have been run through, processing of the components is finalized by resolving the references and then using the components (step 545).

Processing of all the components of a cycle is necessary since it is only at the end of a cycle that it is possible to determine which components are actually used; however, it is not necessary to receive all the components of the document in order to be able to use them. Test 510 makes it possible to process all the components necessary without having to run through the document a second time.

Figure 6:
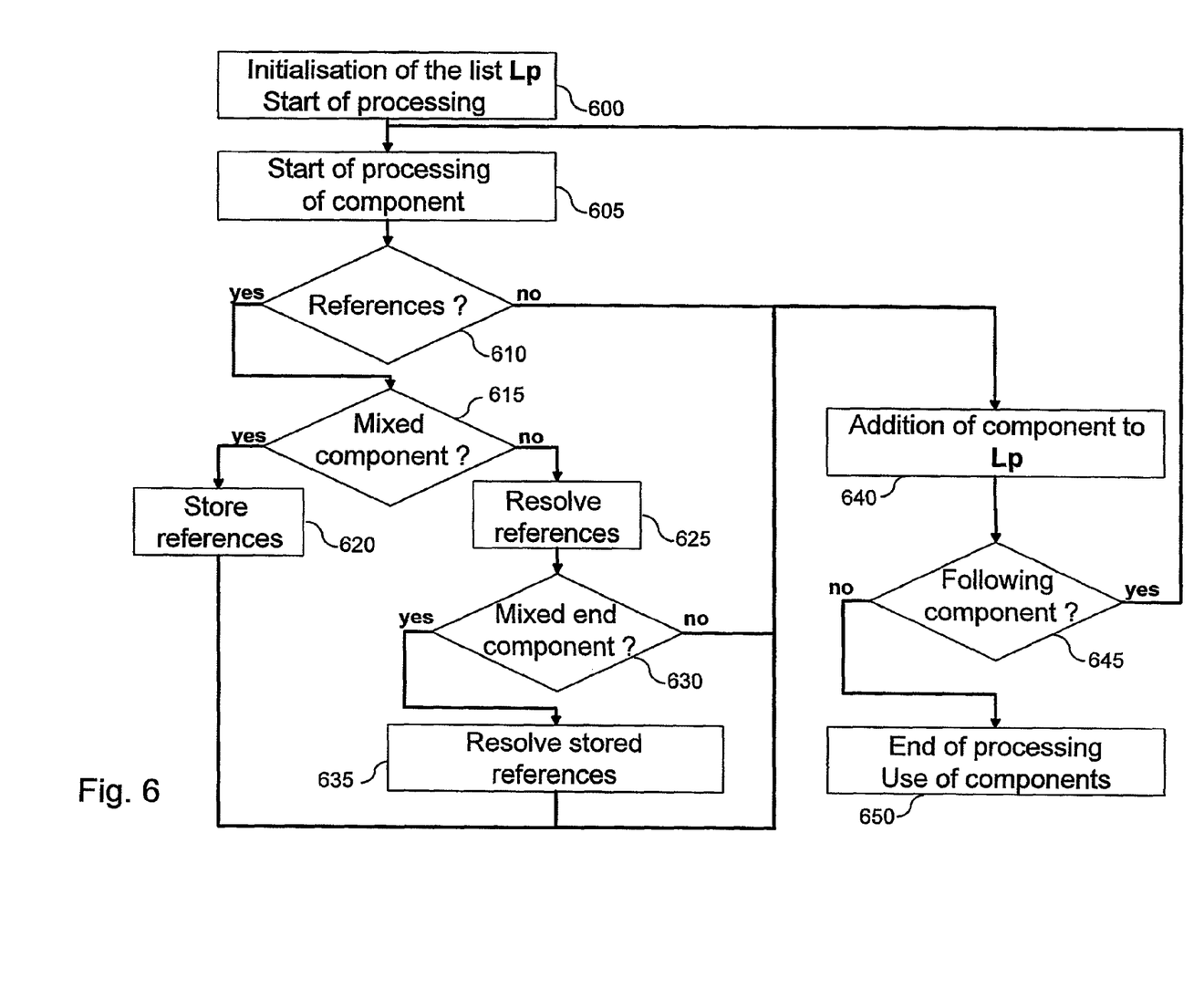
FIG. 6 illustrates an example of an algorithm for processing a sequenced document according to a "backward" mode.

The "backward" processing algorithm illustrated in FIG. 6 differs from the conventional algorithms because of the management of the mixed components.

It should be noted here also that the document received may have been coded previously and stored (locally or on a distant site) or that it may be coded when the client sends his request.

After having initialized the list Lp of components (step 600), that is to say emptying this list, processing of the XML document commences with the selection of the first component received and the identification of the components referenced by the selected components (step 605). A first test is carried out in order to determine whether the selected component comprises references (step 610).

If the selected component comprises at least one reference, a second test is carried out in order to determine whether the component received is of the mixed type (step 615). If the component received is of the mixed type, the references are stored in order to be resolved subsequently (step 620). If the component received is not of the mixed type, the references are resolved immediately by making a search amongst the components already processed (step 625). This resolution will be carried out either at the end of the processing or when the end of the mixed components is detected. For this purpose another test is carried out in order to determine whether the component received is of the mixed end type (step 630) and, if the received component is of the mixed end type, the references stored are resolved (step 635).

If the component received does not comprise a reference or when the references are stored or resolved, the component received is added to the list Lp of components (step 640). A test is carried out in order to determine whether a new component has been received (step 645). If a new component has been received, that is to say if the document comprises other components, the previous steps (605 to 645) are repeated. If the document does not comprise another component, the components can be used by the application that sent the request for obtaining the XML (step 650).

The algorithm described with reference to FIG. 6 makes it possible to minimize the management of the references whilst keeping the ability to process all the documents possible, that is to say the documents comprising simple or mixed components.

Naturally, in order to satisfy specific requirements, a competent person in the field of the invention will be able to apply modifications in the above description.

The invention claimed is:

1. A method of sequencing components of an XML type document comprising a plurality of components, thereby obtaining a sequenced list of components of the document, the method comprising parsing each component of the document, wherein for a current component being parsed, the method further comprises:
accessing a first list of forward references to which the component refers in the document, a second list of backward references to which the component refers in the document, and a third list of components of the document that refer to the component in the document;
updating at least one list among the first list, the second list and the third list; and
allocating a position of the current component in the sequenced list, based at least on a first position of a component from either the first and second lists having the highest position in the sequenced list and at least on a second position of a component from the third list having the lowest position in the sequenced list.

2. A method for optimizing the processing of an XML type document comprising a plurality of components, the method comprising the following steps:
receiving an identification of the document and an identification of a document processing mode;
accessing said document according to said identification of said document; and
sequencing the plurality of components according to the method of claim 1 and coding said plurality of components of said document according to said identification of the mode for processing said document.

3. A method according to claim 2, wherein said identification of the mode for processing said document is of a forward or backward type.

4. A method according to claim 3, wherein, if said identification of the mode for processing said document is of the backward type, said sequencing and coding step comprises the following steps:
- selecting a component of said document;
- identifying references of said selected component;
- adding said component to a dependency list and updating said dependency list;
- analyzing said dependency list in order to determine whether at least one component is ready to be coded; and
- if at least one component in said dependency list is ready to be coded, coding each at least one component that is ready to be coded and updating said dependency list.

5. A method according to claim 3, wherein, if said identification of the mode for processing said document is of the forward type, said sequencing and coding step comprises the following steps:
- for each component of said document, selecting the component, identifying references of said selected component, adding said selected component to a dependency list and updating said dependency list; and
- for each component in said dependency list, selecting the component, coding said selected component and updating said dependency list.

6. A method of transmitting an XML type document comprising a plurality of components, the method comprising the following steps:
- receiving a request to transmit said document, said request comprising an identification of said document and an identification of a document processing mode;
- accessing said document according to said identification of said document;
- obtaining said plurality of components of said document, the plurality of components having been sequenced according to the method of claim 1 and according to said identification of the mode for processing said document; and
- transmitting at least one sequenced component of said plurality of components of said document.

7. A method for optimizing the processing of an XML type document comprising a plurality of components, the method comprising the following steps:
- identifying said document;
- identifying a mode for processing said document;
- transmitting a request for accessing said document, whose components have been sequenced according to the method of claim 1 and according to said identification of the mode for processing said document;
- accessing at least one component of the sequenced components of said document; and
- processing said at least one accessed component of said document, according to said identification of the mode for processing said document.

8. A method according to claim 7, wherein said identification of the mode for processing said document is of the forward or backward type.

9. A method according to claim 8, wherein, if said identification of the mode for processing said document is of a forward type, said step of processing said at least one accessed component comprises the following steps:
- establishing a list of components sought in said document;
- selecting an accessed component;
- analyzing the list of components sought in order to determine whether the selected accessed component belongs to the list of components sought;
- if said selected accessed component belongs to said list of components sought, analyzing said selected accessed component in order to determine whether said selected accessed component refers to at least one other component; and
- if said selected accessed component refers to at least one other component, adding said at least one other referenced component to said list of components sought.

10. A method according to claim 8, wherein, if said identification of the mode for processing said document is of the backward type, said step of processing said at least one accessed component comprises the following steps:
- selecting an accessed component;
- identifying references of said selected accessed component;
- if said selected accessed component does not have a reference, adding the selected accessed component to a list of components;
- if said selected accessed component has at least one reference, analyzing said selected accessed component and performing at least one of (1) storing the references and (2) resolving the references and adding the selected accessed components to said list of components.

11. A method according to claim 7, wherein at least one component of said document is of a simple type or of a mixed type.

12. A device for transmitting an XML type document comprising a plurality of components, the device comprising the following means:
- means for receiving a request to transmit said document, said request comprising an identification of said document and an identification of a document processing mode;
- means for accessing said document according to said identification of said document;
- means for obtaining said plurality of components of the document, the plurality of components having been sequenced according to the method of claim 1 and according to the identification of the mode for processing said document; and
- means for transmitting at least one sequenced component of said plurality of components of said document.

13. A device for optimizing the processing of an XML type document comprising a plurality of components, the device comprising the following means:
- means for identifying said document;
- means for identifying a mode for processing said document;
- means for transmitting a request for accessing said document whose components have been sequenced according to the method of claim 1 and according to said identification of the mode for processing said document;
- means for accessing at least one component of the sequenced components of said document; and
- means for processing the at least one accessed component of said document, according to said identification of the mode for processing said document.

14. A device according to claim 13, further comprising the following means:
- means for establishing a list of components sought;
- means for selecting an accessed component;
- means for analyzing said list of components sought in order to determine whether said selected accessed component belongs to said list of components sought;
- means for analyzing said selected accessed component in order to determine whether said selected accessed component refers to at least one other component; and
- means for adding said at least one other referenced component to said list of components sought.

15. A device according to claim 13, further comprising the following means:
- means for selecting a component accessed;
- means for identifying references of said selected component accessed;
- means for adding said selected accessed component to a list of components;
- means for storing said references; and
- means for resolving the references.

16. A method according to claim 1, wherein the first position is lower than the second position and wherein the position allocated to the current component is a position following the first position.

17. A method according to claim 1, wherein the first position is higher than the second position, the method further comprising the following steps:
- determining a fourth list of components from the second list having a position in the document between the first position and the second position,
- determining a fifth list of components from the third list having a position in the document between the first position and the second position,
- modifying the positions of the components from the fourth list so that they have respective modified positions lower than the second position, and
- modifying the positions of the components from the fifth list so that they have respective modified positions lower than the first position.

18. A method according to claim 17, wherein modifying the positions of the components from the fourth or the fifth list comprise a step of exchanging the position of a first component with the position of a second component that is in the same fourth or fifth list and that has the closest higher position and that does not reference the first component.

19. A method according to claim 17, wherein modifying a the positions of the components from the fourth or the fifth list comprises a step of exchanging the position of a third component with the position of a fourth component that is in the same fourth or fifth list and that has the closest lower position in the document and that is not referenced by the third component.

20. A method according to claim 17, wherein the position of a fifth component of the fourth or the fifth list is modified according to the method of claim 19 if a sixth component of the same fourth or fifth list having the closest higher position in the document references the fifth component, and wherein the position of the fifth component is modified according to the method of claim 18 if the fifth component references a seventh component of the same fourth of fifth list that has the closest lower position in the document.

21. A method according to claim 1, wherein the first position is lower than the second position, the method further comprising the following steps:
- aggregating components having positions between the first and the second positions in a new component, and
- allocating to the new component the position following the first position.

22. A device for optimizing the processing of an XML type document comprising a plurality of components, the device comprising the following means:
- means for receiving an identification of said document and an identification of a document processing mode;
- means for accessing the document according to said identification of said document; and
- means for sequencing and coding said plurality of components of said document according to said identification of the mode for processing said document, wherein said means for sequencing and coding comprises:
- means for obtaining a sequenced list of components of the document; and
- means for parsing each component of the document, wherein for a current component being parsed, the means for sequencing and coding further comprises:
- means for accessing a first list of forward references to which the component refers in the document, a second list of backward references to which the component refers in the document, and a third list of components of the document that refer to the component in the document,
- means for updating at least one list among the first list, the second list and the third list; and
- means for allocating a position of the current component in the sequenced list, based at least on a first position of a component from either the first and second lists having the highest position in the sequenced list and at least on a second position of a component from the third list having the lowest position in the sequenced list.

23. A device according to claim 22, further comprising the following means:
- means for selecting a component of said document;
- means for identifying references of said component selected;
- means for adding said component to a dependency list and updating said dependency list;
- means for selecting a component of said dependency list; and
- means for coding said selected component in said dependency list and for updating said dependency list.

24. A non-transitory computer-readable storage medium having retrievably stored thereon instructions which, when executed by processing means of a device, cause said device to perform steps comprising:
- receiving an identification of the document and an identification of a document processing mode;
- accessing said document according to said identification of said document; and
- sequencing and coding said plurality of components of said document according to said identification of the mode for processing said document, wherein the sequencing and coding comprises:
- obtaining a sequenced list of components of the document; and
- parsing each component of the document, wherein for a current component being parsed, the sequencing and coding further comprises:
- accessing a first list of forward references to which the component refers in the document, a second list of backward references to which the component refers in the document, and a third list of components of the document that refer to the component in the document,
- updating at least one list among the first list, the second list and the third list; and
- allocating a position of the current component in the sequenced list, based at least on a first position of a component from either the first and second lists having the highest position in the sequenced list and at least on a second position of a component from the third list having the lowest position in the sequenced list.

25. A non-transitory computer-readable storage medium having retrievably stored thereon instructions which, when executed by processing means of a device, cause said device to perform a method of sequencing components of an XML type document comprising a plurality of components, thereby obtaining a sequenced list of components of the document, the method comprising parsing each component of the document, wherein for a current component being parsed, the method further comprises:

accessing a first list of forward references to which the component refers in the document, a second list of backward references to which the component refers in the document, and a third list of components of the document that refer to the component in the document;

updating at least one list among the first list, the second list and the third list; and allocating a position of the current component in the sequenced list, based at least on a first position of a component from either the first and second lists having the highest position in the sequenced list and at least on a second position of a component from the third list having the lowest position in the sequenced list.

* * * * *